May 4, 1965    K. A. MÜLLERS ETAL    3,181,804
SPOOL-HOLDER FOR WINDING MACHINES
Filed Dec. 4, 1962    2 Sheets-Sheet 1

INVENTORS:
Karl August Müllers
Josef Michl

May 4, 1965   K. A. MÜLLERS ET AL   3,181,804
SPOOL-HOLDER FOR WINDING MACHINES
Filed Dec. 4, 1962   2 Sheets-Sheet 2
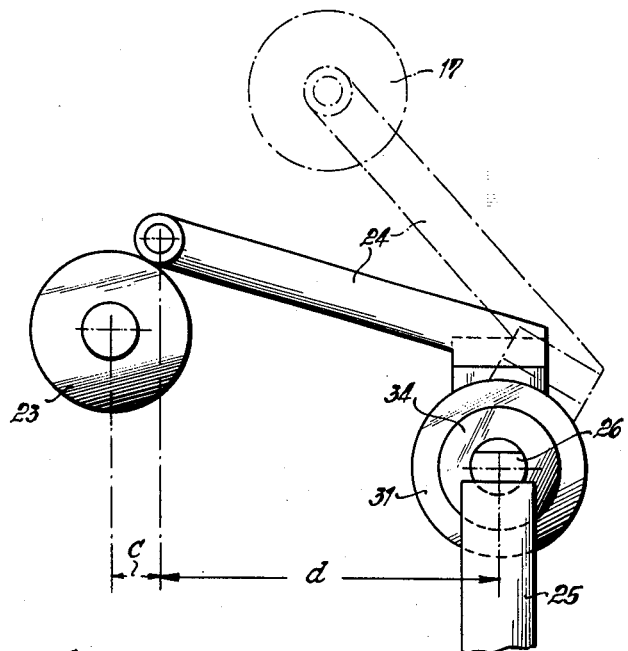
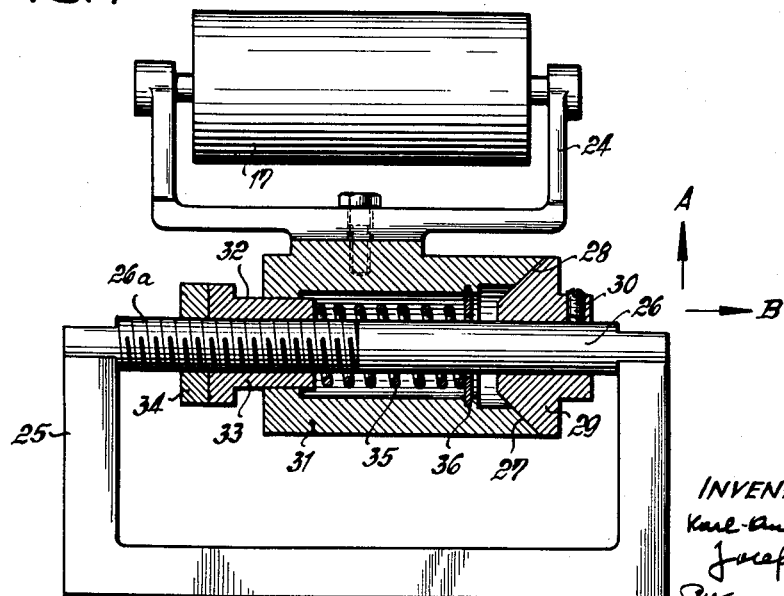
INVENTORS:
Karl-August Müllers
Josef Nell
By Ernest G. Montague
Attorney

# United States Patent Office 3,181,804
Patented May 4, 1965

3,181,804
SPOOL-HOLDER FOR WINDING MACHINES
Karl August Müllers, Monchen-Gladbach, Rhineland, and Josef Mehl, Wegberg, Rhineland, Germany; said Mehl assignor to said Müllers
Filed Dec. 4, 1962, Ser. No. 242,266
Claims priority, application Germany, Aug. 13, 1962, M 53,880
2 Claims. (Cl. 242—18)

The present invention relates to a spool holder for winding machines, and in particular to a swingably mounted spool holder for receiving the winding spool on winding machines, as well as on automatic winding machines, particularly on automatic traverse winding machines.

It is known that always greater requirements are made concerning the amount of speed of the spools, particularly in connection with automatinc winding machines. In this case the bearing elements of the winding machines have to be considered as the particular parts which are subjected to wear, since just the bearings are sometimes subjected to successive sudden heavy loads within short time intervals.

In order to avoid this drawback, it has been proposed before already, to use so-called damping devices, which can work on an oil-hydraulic principle, as well as on a mechanical principle. The known oil-hydraulic damping devices make, however, intermediate members unavoidable, which are properly interlocked relative to each other at the start, however, are subjected to an appreciable wear after a longer period of operation. In damping devices, which are based on the mechanical working principle, the damping elements are arranged such, that they engage the spool holder by a pressure lock, however, only in one working plane, which has been found as being of a disadvantage.

It is, therefore, one object of the present invention to provide a spool holder for winding machines, wherein the occurring disturbances within the bearings for the spool holders are absorbed and made ineffective to a degree, which could not be obtained before.

It is another object of the present invention to provide a spool holder for winding machines, wherein the spool holder itself is designed as a bearing bushing on the bearing side, which bearing bushing is axially self-adjustable and self-settable, respectively, and which bearing bushing is supported at least at one of its ends by interlocking a complementary bearing and is charged axially against the latter by a pressure lock.

It is still another object of the present invention to provide a spool holder for winding machines, wherein the bearing bushing of the spool holder is formed substantially as a hollow bushing, whereby for the interlocking support of the bearing bushing on a complementary bearing, the bearing bushing has at its supporting side a conical ring face, which cooperates with a complementary conical face of the complementary bearing, which is rigidly secured to the bearing axle. The bearing bushing itself is mounted for axial movement, and is supported at the other end on the periphery of a nut screwed and axially secured to the bearing axle formed for parts of its length as a spindle. A spring wound about the bearing axle within the bearing bushing engages the nut, which spring engages at the other end a supporting ring of the bearing bushing disposed axially in front of the interlocking bearing.

The practical embodiment of the present invention has the surprising and, for the present invention, decisive advantage over the known devices, that this damping device is effective in two working planes disposed crosswise relative to each other, and an automatic adjustment, even in case of wear, is assured. By the arrangement of the spring within the bearing bushing, this automatic adjustment of the bearing is obtained by further movement of the conical ring face of the bearing bushing in axial direction further on the cone of the complementary bearing. In this manner, an automatic adjustment can take place, so that this new damping device complies to the fullest extent with all desired requirements.

Also concerning the structure, the present invention provides decisive advantages. The practical realization of the present invention brings about a completely closed structural arrangement of the spool holder bearing, so that the total mounting is practically safe from dust and fibers. In order to reduce the wear, the conical complementary bearing can be made of non-metallic working material, which expedient is also favorable to prevent corrosion occurrences.

With these and other objects in view, which will become apparent in the following detailed description, the present invention will be clearly understood in connection with the accompanying drawings, in which:

FIG. 3 is a schematic side elevation of a spool holder shown in two different positions; and FIG. 4 is a front elevation of the spool holder shown in FIG. 3, partly in section.

Figure 1:
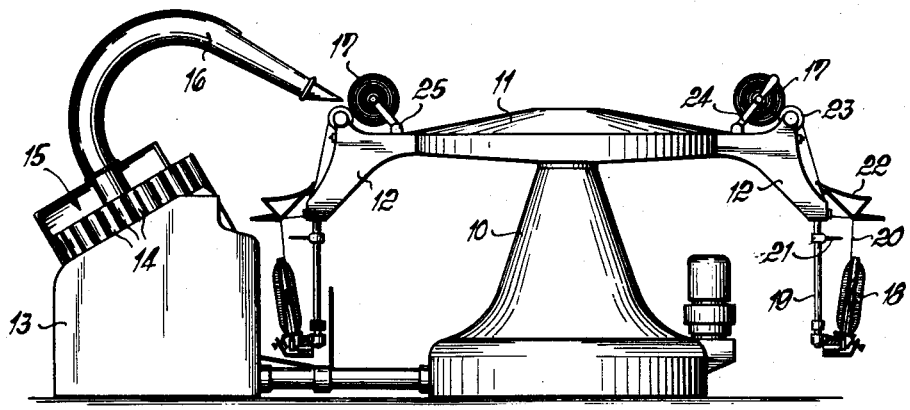
FIGURE 1 is a front elevation of an automatic winding device, in particular, of a cross-winding device.
Figure 2:
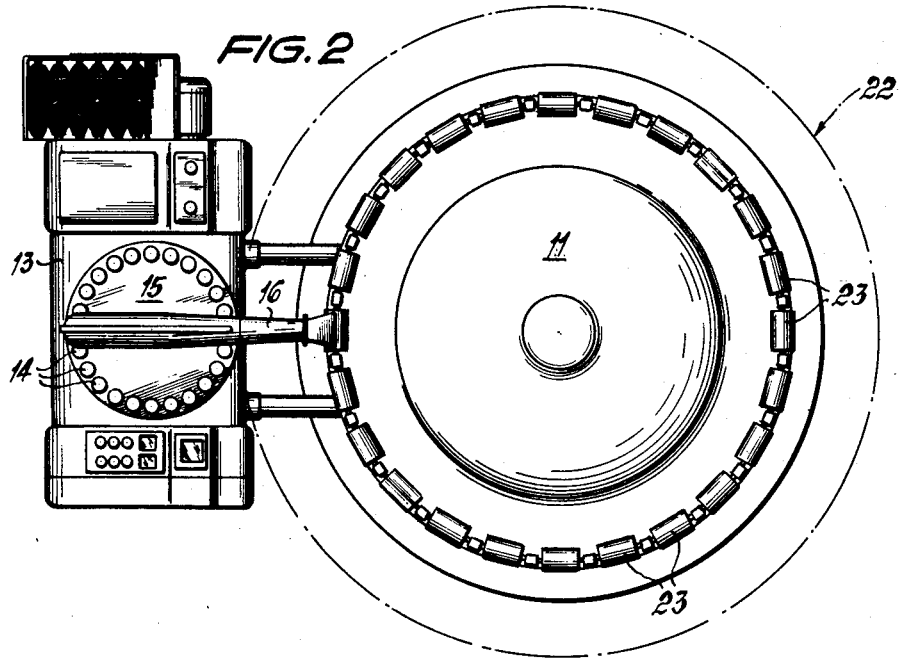
FIG. 2 is a top plan view of the device shown in FIG. 1.

Referring now to the drawings, and in particular to FIGS. 1 and 2, the winding machine comprises a machine stand or socket 10 which carries a rotor 11, on which individual winding locations 12 are disposed. This rotor 11 moves the winding locations 12 past an immovably disposed knot-jointing unit 13, which has a thread knot-jointing device, as well as a magazine 15 receiving full reserve cops and formed of a plurality of individual pockets 14, which magazine 15 is driven in cycles by any conventional means. The drive which performs the individual working movements of the knot-jointing unit 13, is disposed in the housing of the unit 13. Furthermore, the unit 13 is equipped with a suction branch 16 which reaches into the range of a winding spool 17 and which in case of a thread-break sucks up the thread end of the winding spool and feeds the thread end to the knot-jointing device.

As it is further apparent from FIG. 1 of the drawings, the bearing elements for receiving the cops 18 are disposed on rod-like, downwardly directed holders 19, which form a part of the winding location. A thread 20 is pulled from the cops 18 over their head and passes the operating range of a balloon disturber 21, as well as a thread cleaning and braking device 22. The thread 20 is displaced onto the winding spool 17 mounted in spool holders 24 by means of a thread transferring organ, for instance a grooved drum 23, or the like.

The operation of such automatic winding device resides in the fact, that the individual winding locations 12 pass by successively the immovable knot-jointing unit 13 during its rotation. As long as a winding location 12 is not disturbed, its passes by freely the knot-jointing unit 13. If it is disturbed, however, that means, if for instance, a cop 18 has run out, the particular winding location 12 is brought to a standstill for a short time period opposite the knot-jointing unit 13, whereby the empty sleeve is thrown off and a new cop is mounted thereon. By a disturbance caused by a thread-break, a knot-rejointing program is performed in contradiction to the previously mentioned cop exchanging program.

In accordance with the present invention, the spool holders 24 receiving the winding spools 17 are mounted on a spool holder axle 26 secured to the frame parts 25.

This mounting is brought about substantially by means of a hollow bushing 31, which has at one end a conical ring base 27, which supports itself in engaging manner on a complementary conical face 28 of a complementary bearing 29, which complementary bearing 29 is secured rigidly on the bearing axle 26 by means of a set screw 30. At the other end, the hollow bearing bushing 31 is mounted on the periphery 32 of an adjustment nut 33, which is axially secured by a safety nut 34. The nut 33 is screwed to the part of the bearing axle 26 which is formed as a threaded spindle 26a.

A spring 35 is disposed within the bearing bushing 31 and cause a pressure locking between the bearing bushing 31 and the complementary bearing 29, which spring 35 engages at one end on the adjustment nut 33 on the one hand, and on a supporting ring 36, on the other hand, which supporting ring 36 is disposed axially in front of the pressure lock bearing. In this manner the spool holder 24 and its mounting, respectively, is adjustable in the direction of the arrrow A as well as in direction of the arrow B. The spring 35 causes furthermore the retaining of the adjusted engaging pressure. The adjustment in the direction of the arrow A is made possible, because due to the conical bearing surfaces a radial component will emerge from the axial spring force, which permits adjustment in radial direction in case of uneven wear.

In case of a predetermined selection of the working material for the bearing bushing 31, on the one hand, and for the complementary bearing 29, on the other hand, the spool holder 24 can be braked in its movements, due to the friction coefficient of the spool holder 24, so that jolts occurring during the winding process are absorbed to their greatest part by the elastic thread layers of the winding spool.

As particularly clearly shown in FIG. 3, by a proper arrangement a progressive discharge occurs between the mounting of the spool holder 24 to the thread guiding element 23, that means, that the engaging pressure between the winding spool 17 and the thread guiding element 23 is balanced, because upon increasing the diameter of the winding spool, the effective lever arm $c$ and $d$, respectively, is changed.

While we have disclosed one embodiment of the present invention, it is to be understood that this embodiment is given by example only and not in a limiting sense, the scope of the present invention being determined by the objects and the claims.

We claim:
1. A spool holder unit receiving the winding spool on automatic winding machines, comprising
 a spool holder adapted to support a winding spool,
 a bearing bushing secured to said spool holder,
 said bearing bushing having a conical bearing surface formed at one end thereof,
 a bearing immovable relative to said bearing bushing and having a complementary bearing surface engaging said bearing surface of said bearing bushing,
 said bearing bushing being axially movable toward and from, respectively, said bearing surface of said bearing, and
 spring means urging said bearing surfaces into engagement with each other, thereby providing automatic adjustment of said bearing bushing,
 a spring means adjustment member disposed opposite said bearing and controlling the force of said spring means, and
 said bearing bushing riding at the other end thereof on said adjustment member for axial movement toward said bearing.
2. The spool holder, as set forth in claim 1, which includes
 a bearing axle extending through and supporting said bearing bushing,
 means for rigidly securing said complementary bearing to said bearing axle,
 a portion of said bearing axle including a threaded spindle,
 said member being a threaded nut mounted on and axially secured to said threaded spindle,
 said bearing bushing being axially movable relative to said bearing axle and mounted on said nut at its end opposite said bearing end,
 said spring means being disposed within said bearing bushing and wound around said bearing axle,
 one end of said spring means engaging an end face of said nut, and
 a supporting ring carried by said bearing bushing and surrounding said bearing axle with the other end of said spring means engaging said supporting ring and urging said supporting ring and said bushing toward said member.

References Cited by the Examiner
UNITED STATES PATENTS

| | | | |
|---|---|---|---|
| 1,521,179 | 12/24 | Garon | 242—18 |
| 1,712,310 | 5/29 | Sayre. | |
| 2,016,757 | 10/35 | Tryon | 308—70 |
| 2,337,112 | 12/43 | King | 242—129.51 |

DONALD W. PARKER, *Primary Examiner.*

RUSSELL C. MADER, MERVIN STEIN, *Examiners.*